United States Patent
Kim

(10) Patent No.: US 11,938,568 B2
(45) Date of Patent: Mar. 26, 2024

(54) METHOD FOR PROCESSING SUPERFINE BLADE EDGE USING FEMTOSECOND LASER

(71) Applicant: 21TH CENTURY CO., LTD, Hwaseong-si (KR)

(72) Inventor: Sung Hwan Kim, Suwon-si (KR)

(73) Assignee: 21 TH CENTURY CO., LTD, Hwaseong-si (KR)

( * ) Notice: Subject to any disclaimer, the term of this patent is extended or adjusted under 35 U.S.C. 154(b) by 729 days.

(21) Appl. No.: 16/972,484

(22) PCT Filed: May 22, 2019

(86) PCT No.: PCT/KR2019/006105
§ 371 (c)(1),
(2) Date: Dec. 4, 2020

(87) PCT Pub. No.: WO2020/111411
PCT Pub. Date: Jun. 4, 2020

(65) Prior Publication Data
US 2021/0268606 A1    Sep. 2, 2021

(30) Foreign Application Priority Data
Nov. 27, 2018  (KR) .......................... 10-2018-0148258

(51) Int. Cl.
*B23K 26/352*  (2014.01)
*B23K 26/03*   (2006.01)
(Continued)

(52) U.S. Cl.
CPC ........ *B23K 26/3576* (2018.08); *B23K 26/032* (2013.01); *B23K 26/042* (2015.10);
(Continued)

(58) Field of Classification Search
CPC .......................... B23K 26/042; B23K 26/0093; B23K 26/362; B23K 26/0624; B23K 26/032; B23K 26/0732
See application file for complete search history.

(56) References Cited

U.S. PATENT DOCUMENTS 5,471,970 A * 12/1995 Sakarcan ............... B24D 5/123
                                                  76/112
6,353,205 B1 * 3/2002 Izard ..................... B23D 65/00
                                                  219/121.72
(Continued)

FOREIGN PATENT DOCUMENTS

CN         101730616 A  *  6/2010   ............. B28D 1/225
CN         103465187 A  *  12/2013
(Continued)

*Primary Examiner* — Thien S Tran
(74) *Attorney, Agent, or Firm* — Goldilocks Zone IP Law

(57) ABSTRACT

Proposed is a method of processing a superfine blade edge using a femtosecond laser, the method including primarily grinding a blade edge portion by using a grinding wheel, the blade edge being primarily ground in a direction vertical to a rotational direction of the grinding wheel; and
secondarily grinding at least a part of the blade edge portion by emitting a femtosecond laser to the ground blade edge portion in a lengthwise direction, wherein the secondarily grinding includes: oscillating the femtosecond laser; modifying the energy distribution of the femtosecond laser; aligning a central portion of the energy distribution of the femtosecond laser to an end portion of the blade edge portion; changing an advancing direction of the femtosecond laser; and emitting the femtosecond laser to the blade edge portion while moving, in the lengthwise direction of the blade, a stage on which the blade is placed.

6 Claims, 12 Drawing Sheets

(51) Int. Cl.
    *B23K 26/042* (2014.01)
    *B23K 26/06* (2014.01)
    *B23K 26/0622* (2014.01)
    *B23K 26/073* (2006.01)
    *B23K 101/20* (2006.01)

(52) U.S. Cl.
    CPC ...... *B23K 26/0624* (2015.10); *B23K 26/0648* (2013.01); *B23K 26/0732* (2013.01); *B23K 26/0665* (2013.01); *B23K 2101/20* (2018.08)

(56) References Cited

U.S. PATENT DOCUMENTS

| | | | | |
|---|---|---|---|---|
| 6,903,304 | B1 * | 6/2005 | McLellan | B23D 63/08 |
| | | | | 219/121.85 |
| 7,060,367 | B2 * | 6/2006 | Yamada | B26B 21/60 |
| | | | | 428/587 |
| 2004/0258108 | A1 * | 12/2004 | Iehisa | H01S 3/1312 |
| | | | | 372/29.011 |
| 2005/0028389 | A1 * | 2/2005 | Wort | B26B 21/58 |
| | | | | 30/346.54 |
| 2005/0155956 | A1 * | 7/2005 | Hamada | B23K 26/40 |
| | | | | 219/121.68 |
| 2008/0202167 | A1 * | 8/2008 | Cavallaro | C03B 25/025 |
| | | | | 219/121.68 |
| 2009/0039061 | A1 * | 2/2009 | Kondo | B23K 26/361 |
| | | | | 219/121.72 |
| 2011/0139759 | A1 * | 6/2011 | Millman, Jr. | B23K 26/0823 |
| | | | | 219/121.72 |

FOREIGN PATENT DOCUMENTS

| | | |
|---|---|---|
| JP | 11-285924 A | 10/1999 |
| JP | 2011-000667 A | 1/2011 |
| JP | 2018-126788 A | 8/2018 |
| KR | 10-0762074 B1 | 10/2007 |
| KR | 10-0917140 B1 | 9/2009 |
| KR | 10-2012-0043850 A | 5/2012 |
| KR | 10-1478048 B1 | 12/2014 |
| KR | 10-2015-0121340 A | 10/2015 |

* cited by examiner

[FIG 1]
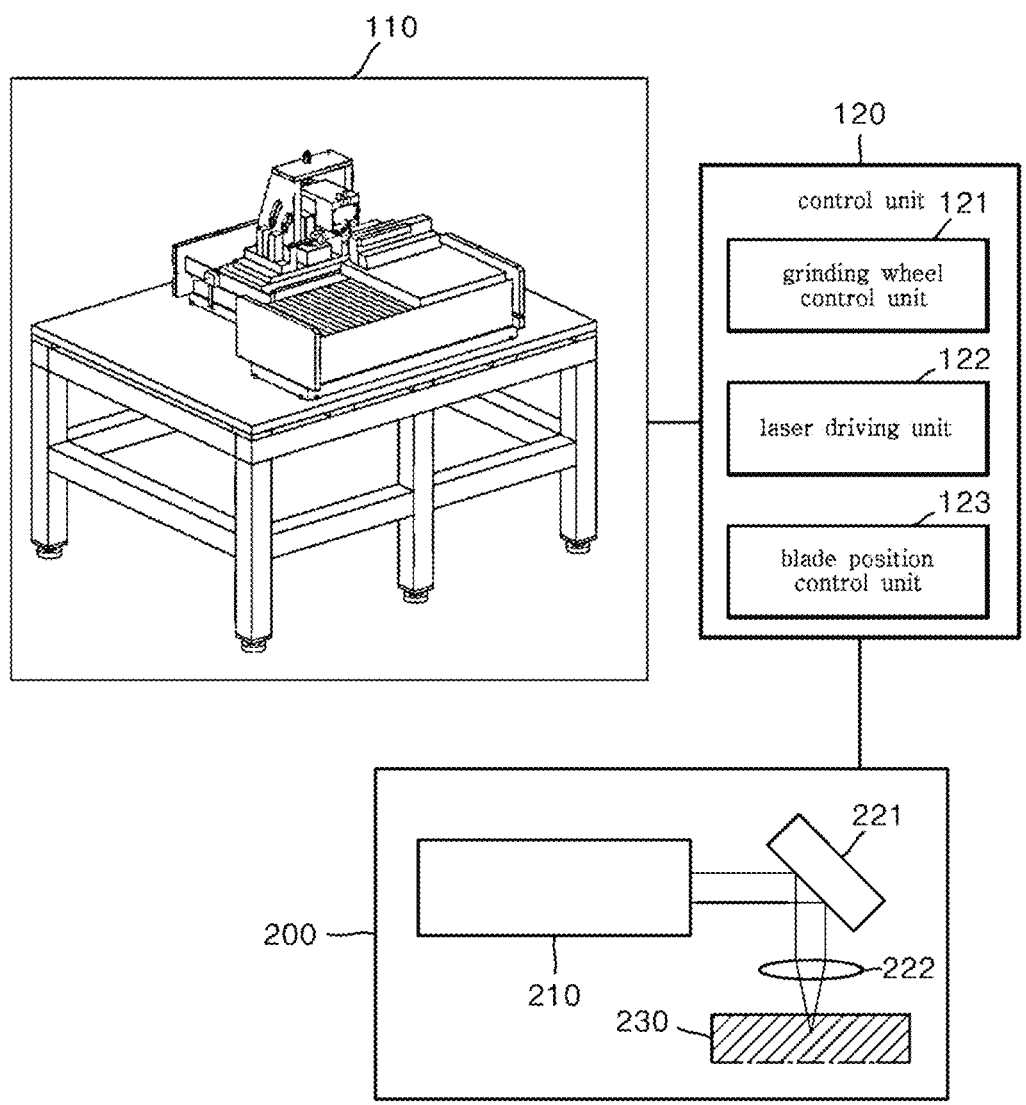

[FIG 2]
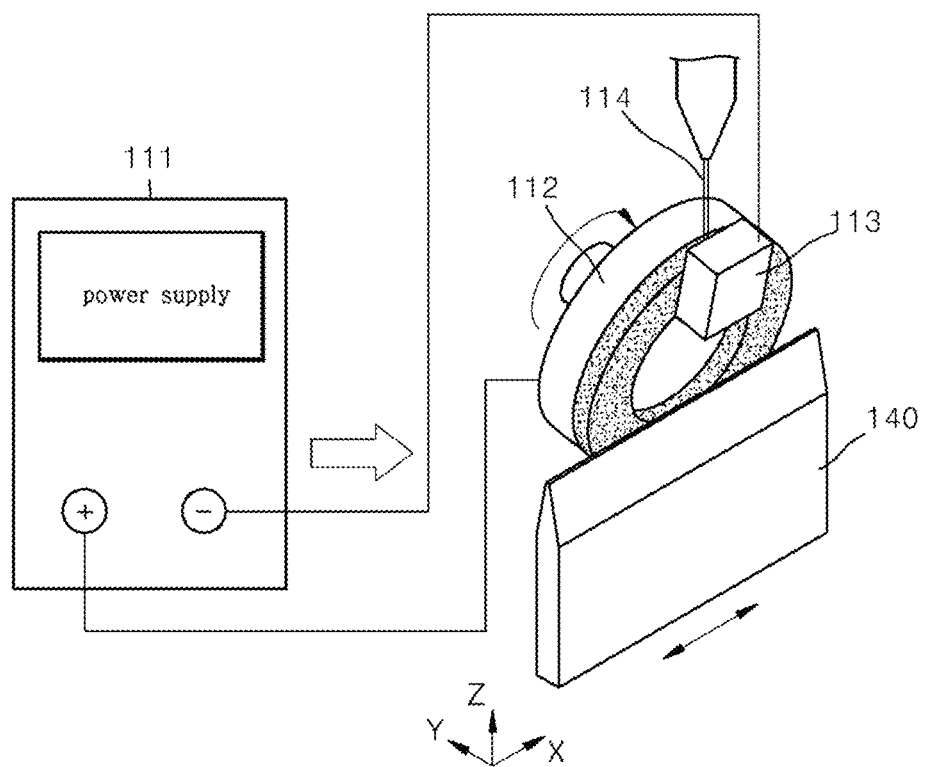

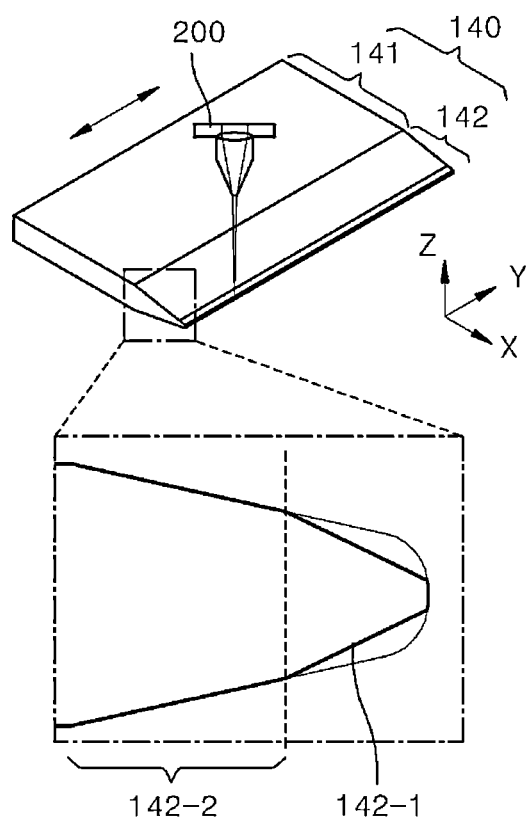
[FIG 3]

[FIG 4]
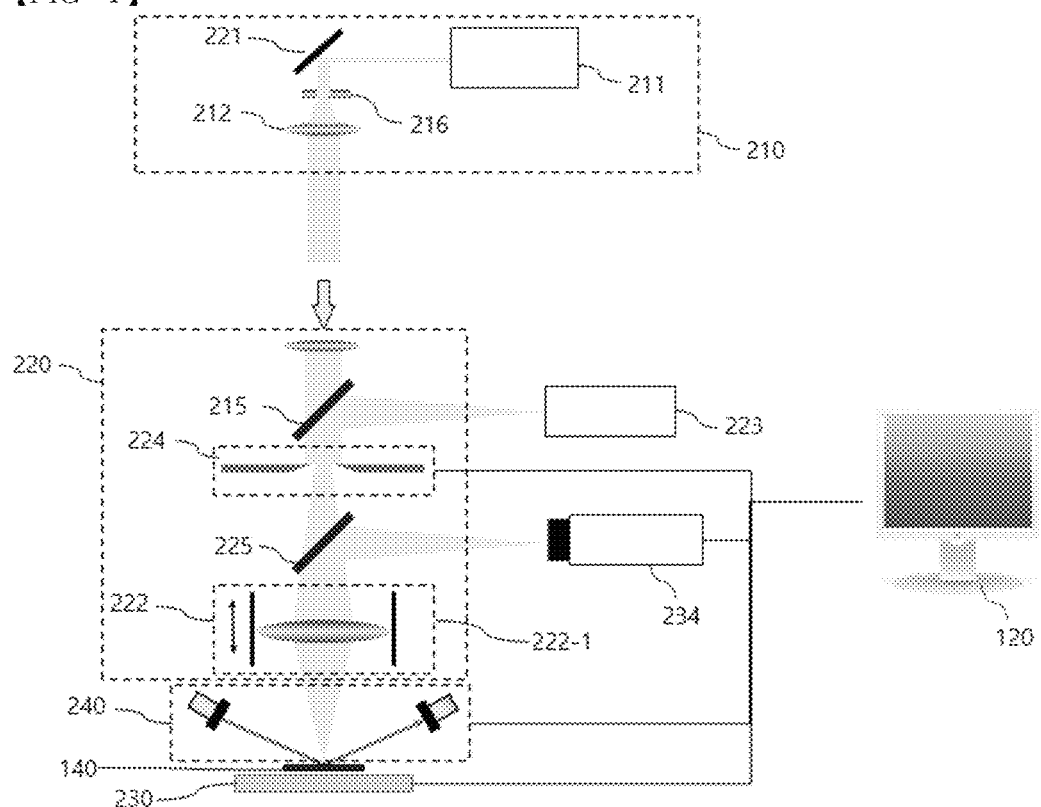
[FIG 5]
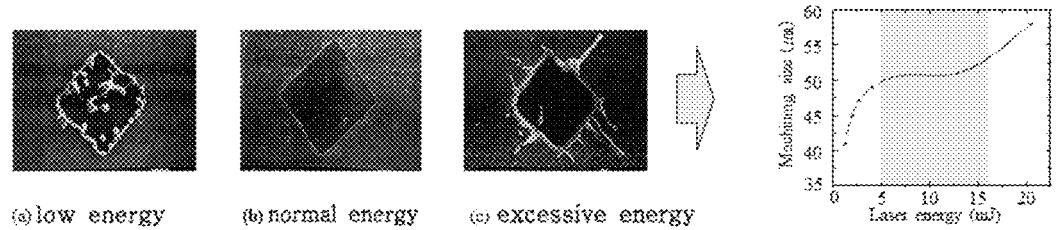
(a) low energy    (b) normal energy    (c) excessive energy

[FIG. 6]
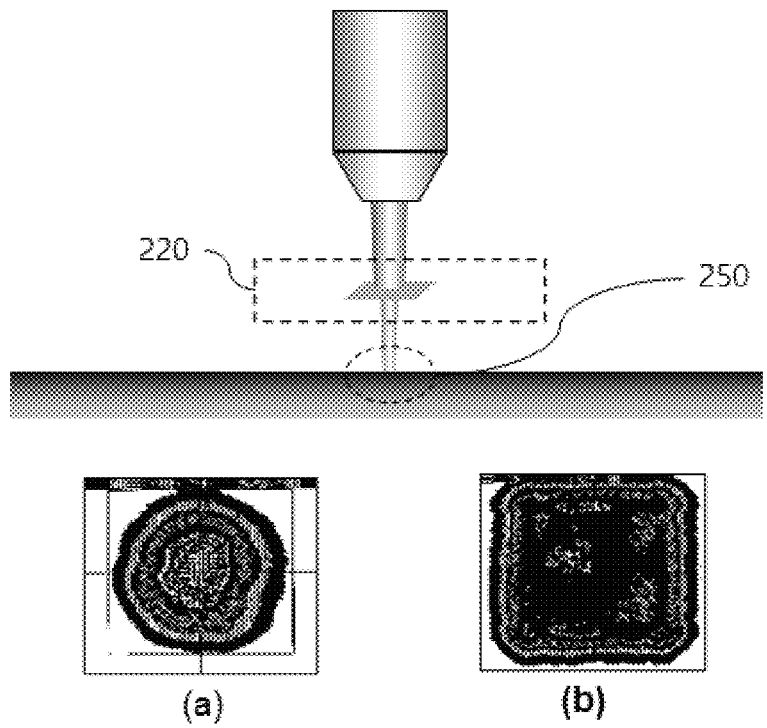
[FIG. 7]
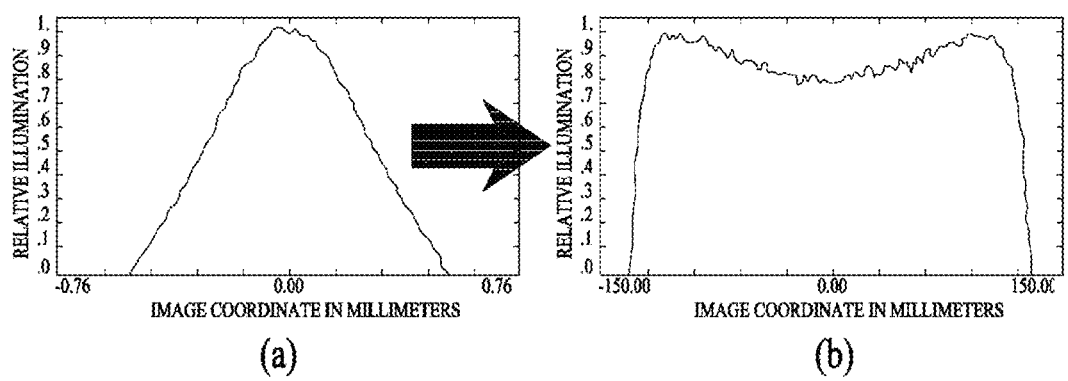

[FIG 8]
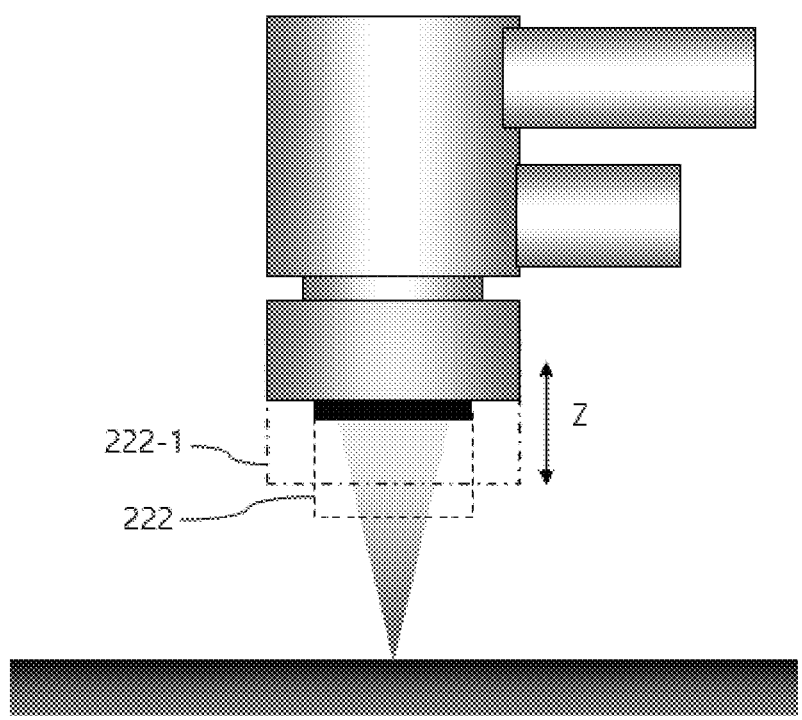

[FIG 9]
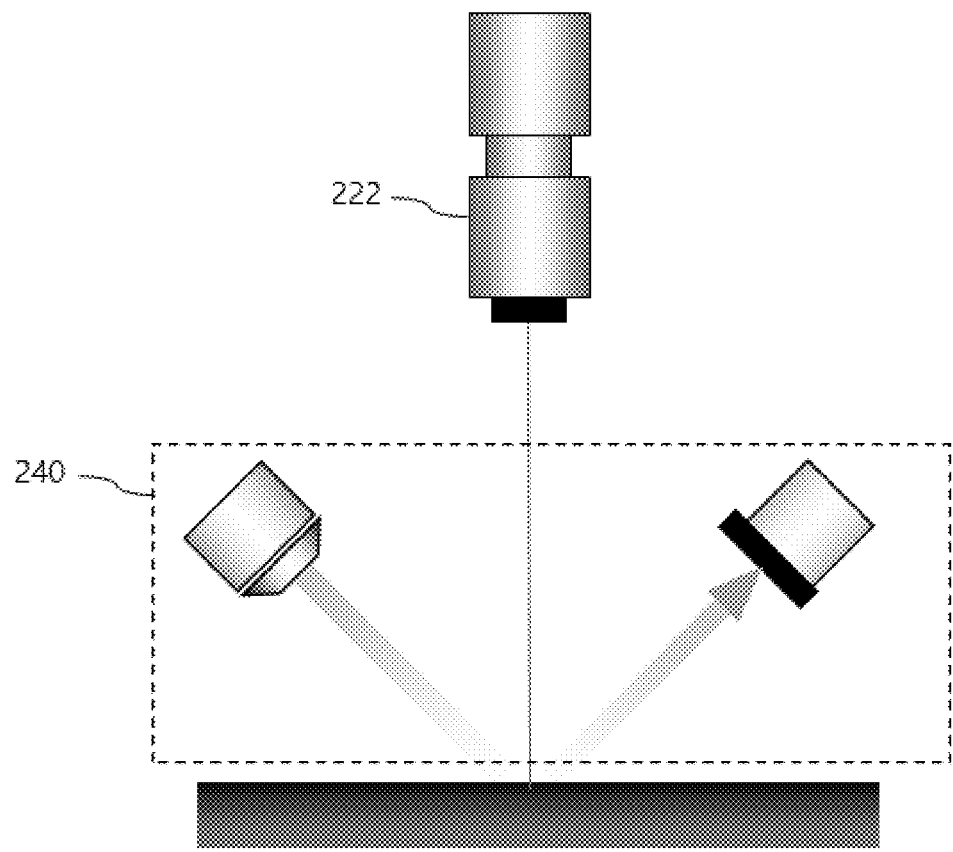
[FIG 10]
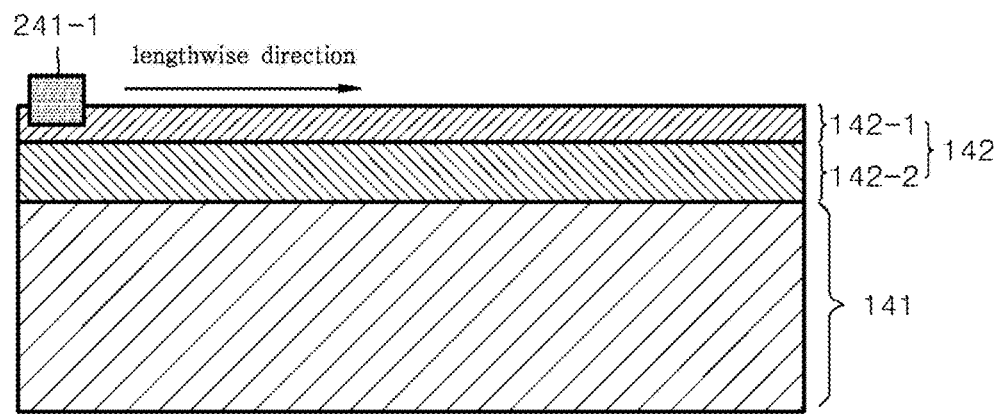

[FIG 11]
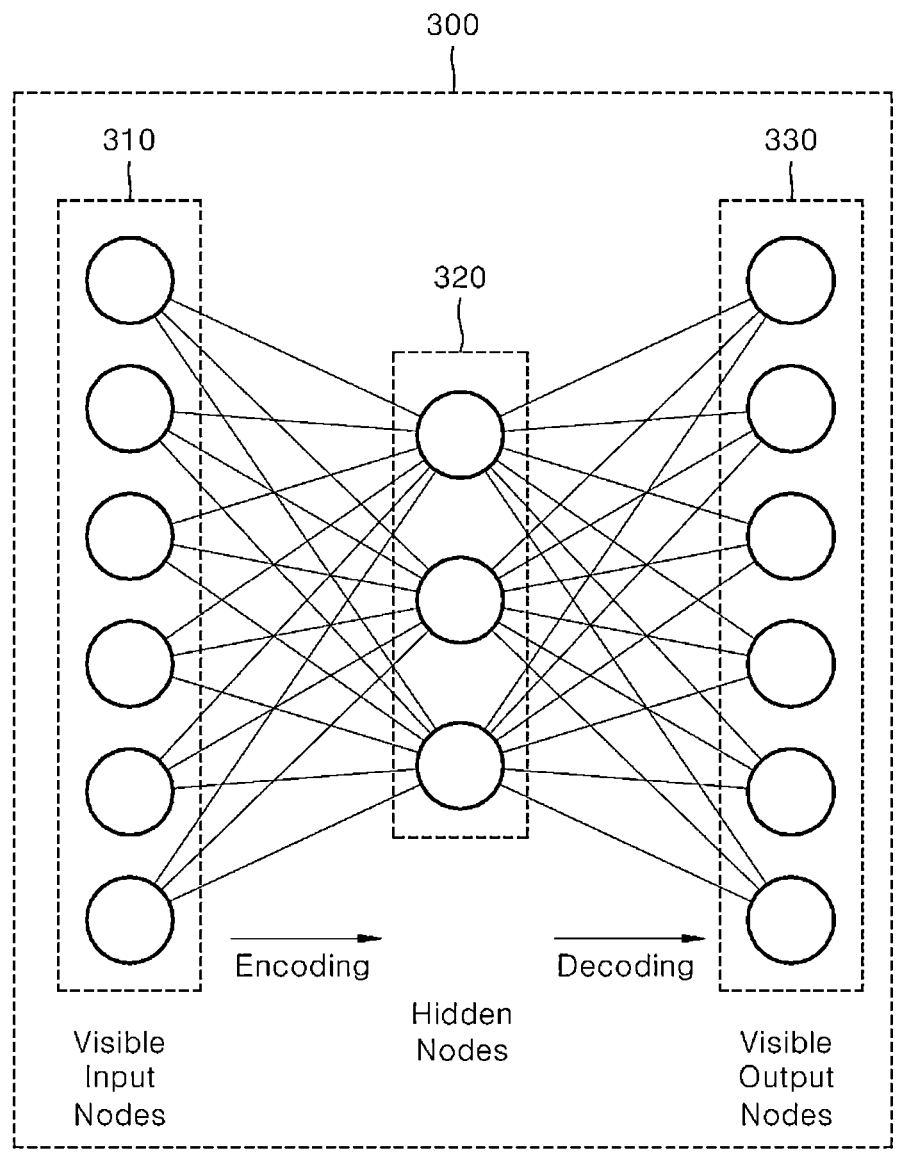

[FIG 12]
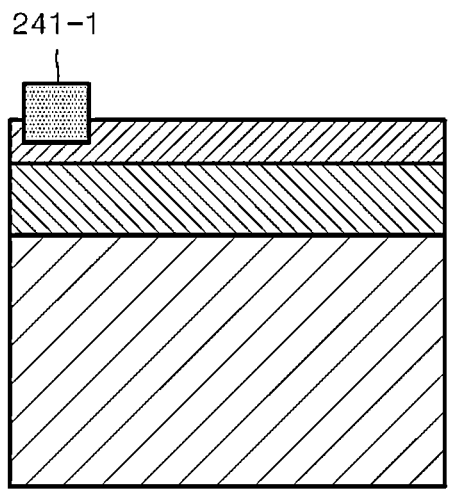
(a)
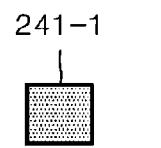
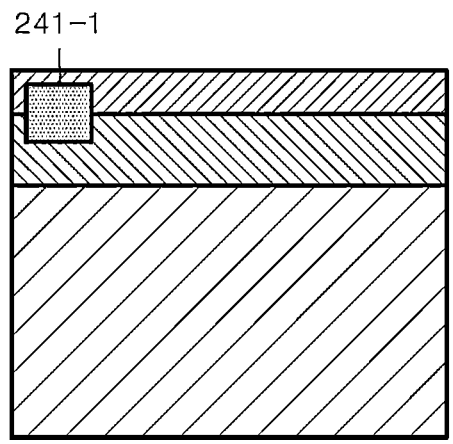
(b)          (c)

[FIG 13]
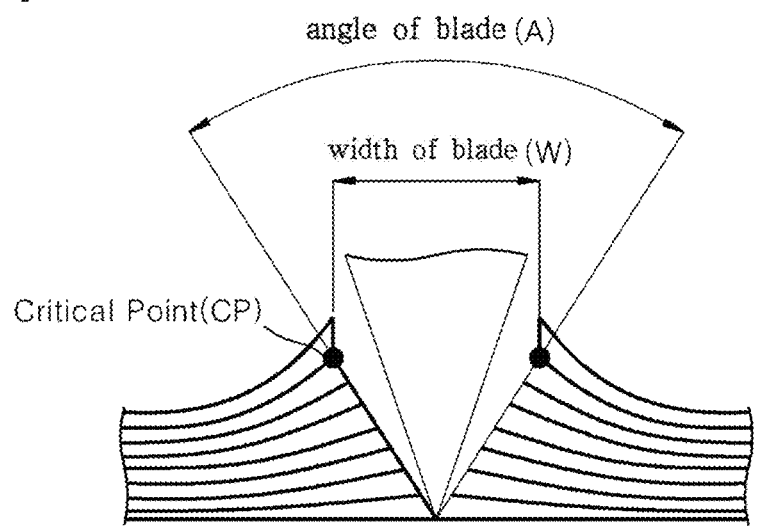
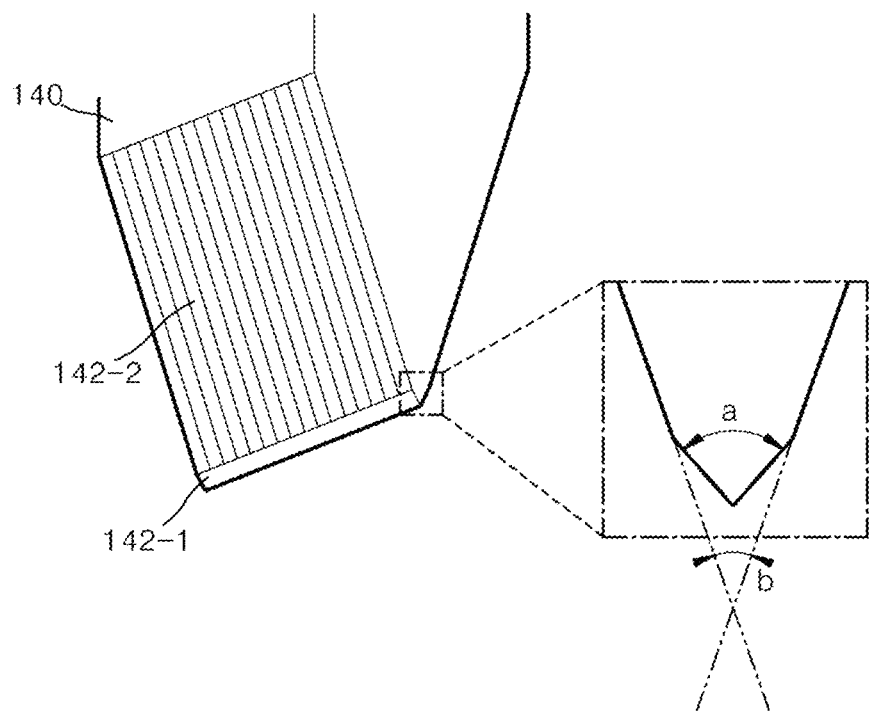

[FIG 14]
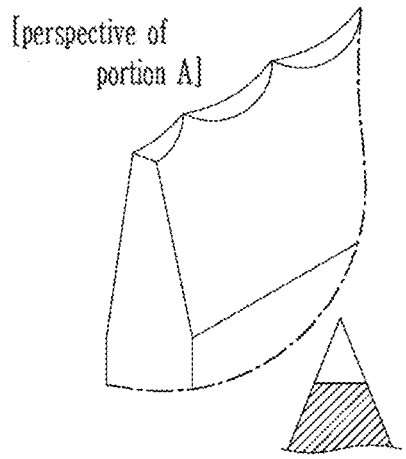
(a)
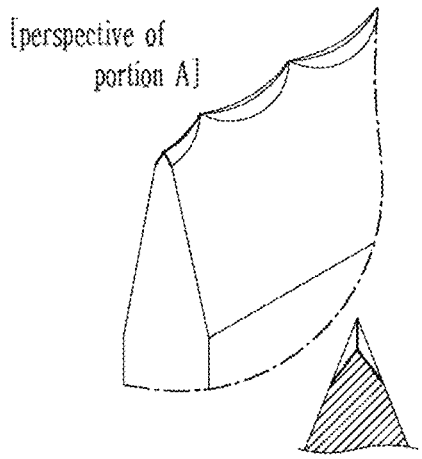
(b)
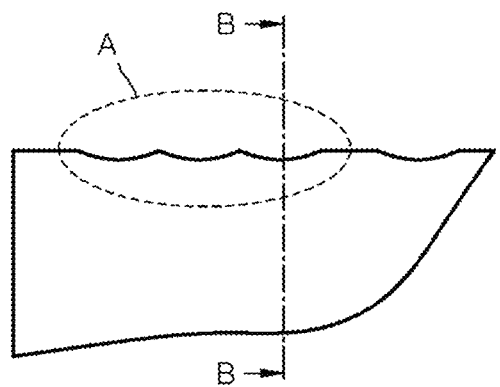
(c)

[FIG. 15]
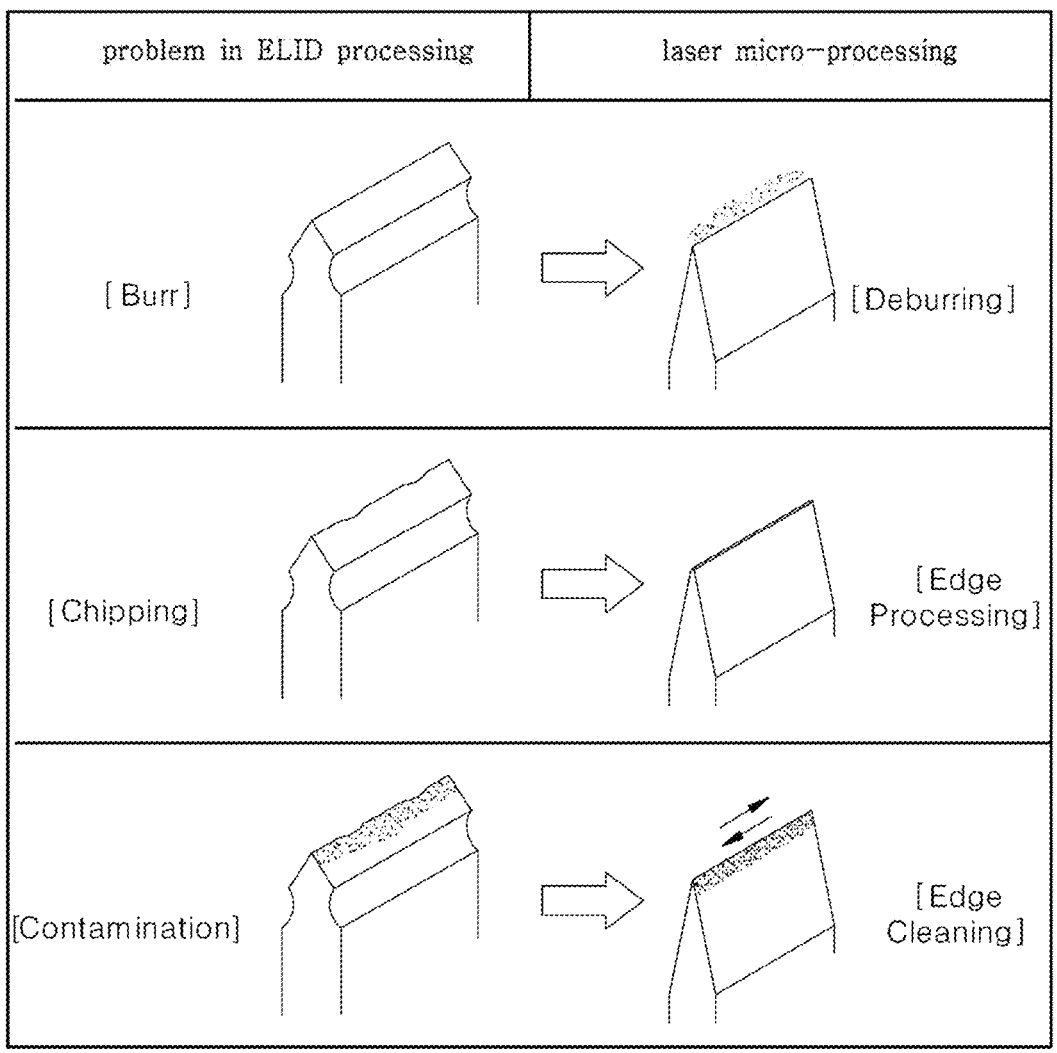

METHOD FOR PROCESSING SUPERFINE BLADE EDGE USING FEMTOSECOND LASER

CROSS-REFERENCE TO RELATED APPLICATIONS

This application claims the benefit under 35 U.S.C. section 371, of PCT International Application No.: PCT/KR2019/006105, filed on May 22, 2019, which claims foreign priority to Korean Patent Application No.: KR10-2018-0148258, filed on Nov. 27, 2018, in the Korean Intellectual Property Office, both of which are hereby incorporated by reference in their entireties.

TECHNICAL FIELD

The present invention relates to a method of processing a superfine blade edge using a laser and, more particularly, to a method of processing a superfine blade edge using a laser, the blade being ground using a femtosecond laser to improve the precision and life thereof.

BACKGROUND ART

A cutting process using a blade is commonly used in manufacturing various parts, which are used in various precision electronic industries such as mobile electric and electronic device, battery, and display industries.

In particular, as industries related to electronic parts including multi-layer ceramic capacitor (MLCC) have developed, the demand for an ultra-precision superfine processing system is increasing rapidly. As miniaturization and precision are needed, general grinding methods and electrolytic in-process dressing (ELID) grinding methods are widely used as ultra-precision processing technology.

Techniques related to grinding are disclosed in Korean Patent Publication No. 10-917140, Korean Patent Publication No. 10-762074, and Korean Patent Publication No. 10-1478048.

Patent Document 1 and Patent Document 2 relate to a general blade grinding method in the related art, and Patent Document 3 relates to a blade grinding method using ELID grinding. In the case of such general grinding and ELID grinding methods, there is a problem that blade life and quality are deteriorated due to various reasons. For example, as the blade edge is excessively polished using the curved surface of the grinding wheel, which is a rotating body, there is a problem that a burring phenomenon occurs in which the polished edge parts do not fall out of the blade, whereby the cutting load is increased and the cutting material is decreased. In addition, as the cutting load increases, a chipping phenomenon may occur in which a part of the blade edge is finely worn away. In addition, contamination of the polishing wheel may remain on the edge of the blade, which results in causing defects.

Therefore, the ultra-precision grinding processing technology has a limitation in technology development due to various problems of the general grinding and ELID grinding methods mentioned above.

DISCLOSURE

Technical Problem

An objective of the present invention is to provide an apparatus and method of processing a blade edge using a laser, the apparatus and method capable of improving the strength of the blade edge to reduce the defect rate of the blade edge and minimize the damage rate of the cutting surface.

Another objective of the present invention is to provide an apparatus and method of processing a blade edge using a laser, the apparatus and method capable of improving the precision of the blade through laser processing.

The objectives of the present invention are not limited to the above, and other objectives that are not mentioned will be clearly understood by those skilled in the art from the following description.

Technical Solution

In order to achieve the objectives mentioned above, a method of processing a superfine blade edge using a femtosecond laser according to an embodiment of the present invention includes primarily grinding a blade edge portion by using a grinding wheel, the blade edge being primarily ground in a direction vertical to a rotational direction of the grinding wheel; and secondarily grinding at least a part of the blade edge portion by emitting a femtosecond laser to the ground blade edge portion in a lengthwise direction, wherein the secondarily grinding comprises: oscillating the femtosecond laser; increasing a size of energy distribution of the femtosecond laser; modifying the energy distribution of the femtosecond laser; aligning a central portion of the energy distribution of the femtosecond laser to an end portion of the blade edge portion; changing an advancing direction of the femtosecond laser and emitting the femtosecond laser to the blade edge portion via a movable objective lens; and emitting the femtosecond laser while moving, in the lengthwise direction of the blade, a stage on which the blade is placed, and wherein the blade edge portion has a first inclined surface and a second inclined surface, the second inclined surface is formed through the primarily grinding, the first inclined surface is formed through the secondarily grinding, and the first inclined surface is formed in such a manner as to have a gentler slope than that of the second inclined surface.

Herein, the modifying of the energy distribution of the femtosecond laser may include modifying a femtosecond laser beam having a Gaussian distribution into a femtosecond laser beam having a rectangular energy distribution using a condensing lens and an aspherical cylindrical lens.

In addition, it is preferable that the energy distribution of the femtosecond laser is square.

In addition, a size of one side of the square energy distribution of the femtosecond laser may be 50 µm or less.

In addition, the aligning of the central portion of the energy distribution of the femtosecond laser to the end portion of the blade edge portion may include photographing, by a CCD camera, the alignment of the blade and the femtosecond laser, extracting a feature vector by inputting the photographed image to an autoencoder, deriving a control amount for controlling a position of the blade based on the feature vector, and aligning the blade edge portion and the femtosecond laser by controlling the stage on which the blade is placed on the basis of the deriving.

In addition, the autoencoder may photographs the alignment of the blade and the femtosecond laser from the CCD camera and receives a photographing result as an input, and the extracting of the feature vector by inputting the photographed image to the autoencoder comprise performing learning so that the autoencoder outputs an image in which the central portion of the energy distribution of the femtosecond laser is normally aligned with the end portion of the blade edge portion.

Other details of embodiments are included in the detailed description and drawings.

Advantageous Effects

According to the present invention, it is possible to reduce the defect rate of the blade edge and minimize the damage rate of the cut surface by enhancing the strength of the blade edge.

In addition, according to the present invention, it is possible to improve the precision of the blade through laser processing.

The effects according to the present invention are not limited by the foregoing, and various other effects are included in the present specification.

DESCRIPTION OF DRAWINGS

FIG. 1 is a schematic diagram showing an apparatus for processing a blade edge using a laser according to an embodiment of the present invention.

FIG. 2 is a view illustrating a grinding process of a blade edge according to an embodiment of the present invention.

FIG. 3 is a view illustrating a laser processing process of a blade edge according to an embodiment of the present invention.

FIG. 4 is a block diagram illustrating a femtosecond laser unit according to an embodiment of the present invention.

FIG. 5 is a view illustrating an energy state and a beam size of a femtosecond laser according to an embodiment of the present invention.

FIGS. 6 and 7 are views illustrating the energy distribution of a femtosecond laser beam according to an embodiment of the present invention.

FIG. 8 is a view illustrating a movable objective lens according to an embodiment of the present invention.

FIG. 9 is a view illustrating automatic focus adjustment according to an embodiment of the present invention.

FIG. 10 is a view illustrating laser precision grinding of a blade and alignment of a blade according to an embodiment of the present invention.

FIG. 11 is a view illustrating an auto-encoder according to an embodiment of the present invention.

FIG. 12 is a view illustrating an input/output image of an auto-encoder according to an embodiment of the present invention.

FIG. 13 is a cross-sectional view illustrating a blade edge portion according to an embodiment of the present invention.

FIG. 14 is a perspective view illustrating a blade according to an embodiment and a comparative example of the present invention.

FIG. 15 is a view illustrating comparison between the present invention and the related art.

MODE FOR INVENTION

Hereinafter, various embodiments of the present invention will be described in detail with reference to the accompanying drawings.

FIG. 1 is a schematic diagram illustrating an apparatus for processing a blade edge using a laser. Referring to FIG. 1, an apparatus 100 for processing a blade edge using a laser includes a grinding unit 110, a femtosecond laser unit 200, and a control unit 120.

The grinding unit 110 may include various components, such as a moving plate, a workpiece (blade 140), a power supply unit 111, a grinding wheel 112, an electrode 113, etc., which are required for grinding the blade edge portion 142, in order to grind an edge of the blade 140 (see FIG. 2).

Specifically, the grinding wheel 112 is seated and fixed on a moving plate supporting various components to be moved in the direction of a transfer device by the moving plate, thereby grinding a cutting edge of the blade 140 fixed vertically to the transfer device. The grinding wheel 112 rotates according to a signal from the control unit 120 that controls the number of rotations, and the number of rotations of the grinding wheel 112 may be determined according to a difference in hardness or target surface roughness of the workpiece and a material of the workpiece. A detailed operation of the grinding wheel 112 will be described later with reference to FIGS. 2 and 3.

In addition, although not shown in FIG. 1, a camera may be installed in the grinding unit 110, and a monitor may be further installed to check and control image information received from the installed camera.

The femtosecond laser unit 200 is configured to perform ultra-precision ultra-fine processing of the blade 140 and include a laser transmission unit 210. The laser transmission unit 210 mainly utilizes a femtosecond laser used for processing ultra-precision materials and the like, and may minimize a thermal effect by emitting photon energy of a microwave width of a femtosecond ($10^{-15}$).

As shown in FIG. 1, the femtosecond laser unit 200 has a mirror 221 installed at a front end thereof in order to change the direction of a light output from the laser transmission unit 210, and a movable objective lens 222 receiving a light reflected through the mirror 221.

The movable objective lens 222 condenses femtosecond pulses, to allow the femtosecond laser light output from the laser transmission unit 210 to be emitted to a local area of the blade 140.

The control unit 120 is configured to control the grinding unit 110 and the femtosecond laser unit 200, and include a grinding wheel control unit 121, a laser driving unit 122, and a blade position control unit 123. Herein, the control unit 120 may be implemented as, for example, various devices, such as a PC, a mobile, or a tablet PC, which are capable of computing functions.

The grinding wheel control unit 121 is configured to control the grinding wheel 112 so that the blade 140 may be ground, and may control the rotational speed and the rotational direction of the grinding wheel 112, and the moving speed of the grinding wheel 112.

The laser driving unit 122 is configured to drive the laser transmission unit 210 included in the femtosecond laser unit 200, and may adjust the intensity and energy distribution of the laser wavelength to emit the laser to the local region of the blade edge portion 142 and control the laser irradiation time and the laser irradiation direction.

The blade position control unit 123 may precisely control a positional relationship between the blade 140 to be ground in the femtosecond laser unit 200 and the laser beam, thereby precisely controlling the laser grinding position of the blade 140.

Hereinafter, with reference to FIGS. 2 and 3, the polishing process of the blade edge portion 142 will be described in detail.

FIG. 2 is a view illustrating a grinding process of a blade edge. FIG. 3 is a view illustrating a laser processing process of a blade edge.

According to a method of processing a superfine blade edge using a laser according to an embodiment of the present invention, the blade edge is ground using a grinding wheel 112, and then a femtosecond laser is emitted only to a local area located at one end of the edge of the ground blade. That is, the method of processing the superfine blade edge using the laser performs both ELID grinding processing technology and laser processing technology, thereby minimizing the defect rate of the blade edge portion 142 to improve precision.

Referring to FIG. 2, when grinding the blade 140, a grinding wheel 112, an electrode 113 disposed opposite to the grinding wheel 112 with a predetermined gap, a power supply, and grinding oil 114 of a conductive grinding fluid are needed.

The grinding wheel 112 may grind the edge of the blade 140 in a surface vertical to the rotational direction of the grinding wheel 112 as the blade 140 moves in an x-axis direction.

The electrode 113 is a grinding electrode and disposed in opposite to the grinding wheel with a predetermined gap.

When the power supply unit applies power to the grinding wheel 112 of an anode (+) and the electrode 113 of a cathode (−) and the grinding oil 114 serving as an electrolyte is supplied between the grinding wheel 112 and the electrode 113, as metal chips present in the grinding wheel 112 are ionized, metals react with oxygen at the anode to form metal oxides, thereby forming an oxide film. Such a metal ionizing process is repeated.

In addition, the grinding unit may further include a nozzle for supplying the grinding oil 114, which is a conductive grinding liquid made of oxygen ions, into the gap between the electrode 113 and the grinding wheel 112. However, as shown in FIG. 2, since the grinding liquid supplied to the gap between the grinding wheel 112 and the electrode 113 is supplied from the outside through the nozzle, the grinding liquid may not be always uniformly supplied to the gap between the grinding wheel 112 and the electrode 113.

Accordingly, as ionization is not properly performed, so that an abrasive grain protrusion of the grinding tip becomes blunt, the grinding processing is performed for a long time with the reduction in grinding performance. When the blade 140 requires higher precision in the grinding process, burring occurs at the edge end of the blade 140 or the temperature of the blade 140 is increased, and chipping is formed on the edge of the ground blade 140 or a fatal problem is caused in the straightness of the edge of the blade.

In a general blade grinding device, even when the blade is to be ground, a tolerance is generated according to the precision of the grinding device. In other words, when the blade is ground using the grinding wheel, the blade may be not ground as an ideal straight line, but be bent.

The apparatus 100 for processing the superfine blade edge using the laser according to an embodiment of the present invention may finely process the blade 140 using the laser, thereby improving the straightness of the blade 140. In the present invention, when performing grinding processing for the blade 140, it is determined to be suitable only when the straightness of the blade 140 is within the range of 10 μm to 25 μm.

Accordingly, a method of performing grinding processing of the blade 140 using a laser according to an embodiment of the present invention is performed by simultaneously performing the grinding method shown in FIG. 2 and the laser processing method shown in FIG. 3, thereby solving the problems as described above.

Referring to FIG. 3, the blade consists of a blade body portion 141 having a flat shape and a blade edge portion 142 extending from the blade body and inclined at a predetermined angle for cutting to form a sharp edge. Herein, the blade edge portion 142 includes a first inclined surface 142-1 and a second inclined surface 142-2.

The first inclined surface 142-1 is an area to which the laser beam is irradiated, that is, a grinding processing range of the blade 140 using a laser. As shown in FIG. 3, the first inclined surface 142-1 has a gentler slope than that of the second inclined surface 142-2, and an angle between the first inclined surface 142-1 and the second inclined surfaces 142-2 is approximately 9°.

In addition, the laser beam irradiated to the first inclined surface 142-1 is a photon energy beam of a microwave width of femtoseconds ($10^{-15}$). When the first inclined surface 142-1 is irradiated by a higher energy laser, a laser of suitable energy should be used since deformation due to heat may occur.

Referring to FIG. 3, the blade 140 may move in the y-axis direction, that is, the direction in which the blade 140 is formed, or move to adjust the distance in an x-axis direction, that is, the height direction of blade.

FIG. 4 is a block diagram illustrating a femtosecond laser unit 200 according to an embodiment of the present invention.

The femtosecond laser unit 200 according to the embodiment of the present invention may include a laser transmission unit 210 for transmitting the femtosecond laser 241, an imaging optical system 220, and a stage 230.

Herein, the laser transmission unit 210 may include a laser oscillator 211, a shutter 212, a beam expander 216, and a mirror 221.

The laser oscillator 211 is configured to oscillate the femtosecond laser 241, and oscillate microwave pulses having a pulse emission time of $10^{-15}$ m/s or less so that the oscillation density of laser energy may be made very large.

Meanwhile, when a femtosecond laser generally has a light energy of 1 mJ and a pulse emission time of 100 femtoseconds or less, the energy density of the laser beam reaches the level of approximately 10 gigawatts, making processing of any material possible. In addition, when a microwave pulse laser beam is radiated to the workpiece, such as a femtosecond laser, multiphoton absorption occurs in composition grid of the material. Herein, since the incident pulse duration is shorter than the time that it takes for the photon to transfer heat to the surrounding composition grid while atoms are excited, problems of laser processing in the related art, problems of laser processing in the related art can be solved, such as a decrease in processing precision due to thermal diffusion capable of occurring while the blade is ground, a physical/chemical change in material, partial melting of the processed part, and the like.

The shutter 212 blocks or passes the laser beam emitted by the laser oscillator 211 to increase concentration and efficiency. Although the shutter 212 may be installed at any place in front of or in back of the beam expander 216, the shutter 212 is installed in front of the beam expander 216 in the present embodiment.

The beam expander 216 serves to enlarge the beam, and may prevent damage of the optical system transmitting the beam due to the energy of the beam and adjust the magnification by a motor controlled by the computer 120. For example, the beam expander 216 increases the size of a femtosecond laser beam from an original size of 5 μm or less to a size of 50 μm or more in both the horizontal and vertical directions.

The imaging optical system 220 includes first and second splitters 215 and 225, an imaging slit 224, and a movable objective lens 222.

Meanwhile, the first splitter 215 serves to allow an aiming beam output from a illumination light source 223 and the femtosecond laser beam to be coaxially incident.

The aiming beam output from the illumination light source 223 serves to guide the femtosecond laser beam from the laser oscillator 211 in such a manner as to be accurately incident on a desired part of the blade 140 to be ground. For example, the aiming beam may be a coaxial He—Ne laser beam.

The imaging slit 224 forms the energy distribution of the laser beam emitted by the laser oscillator 211 so that the femtosecond laser 241 has a uniform energy distribution in a square. The imaging slit 224 may use a precision imaging slit system, which is, for example, a square movable slit.

As shown in FIG. 5, in the case of the femtosecond laser beam, it is generally understood that the larger the energy applied, the larger the beam size. When the energy is excessively applied, the surrounding area of the portion to be ground is melted during grinding, as shown in (c) of FIG. 5. Meanwhile, the grinding itself does not proceed properly when low energy is applied as shown in (a) of FIG. 5. Accordingly, the beam size should be limited to about 5 μm for the purpose of normal grinding as shown in (b) of FIG. 5.

Herein, as shown in FIG. 10, the beam 241-1 formed through the imaging slit 224 has a laser beam size of about 50 μm or less that makes the beam be easily aligned despite the defect on the first inclined surface 142-1 of the blade 140 and the straightness of the blade 140 (approximately 25 μm or less). Here, the reason that the size of the beam is determined to be 50 μm or less is because a difference between left and right side heights of the blade may is approximately 25 μm or less due to the straightness although the grinding is performed with the size of the defect of about 1 μm or less. In general, since the blade having the straightness of 25 μm or more is considered defective, the size of the beam is preferably set to 50 μm or less. In addition, when the size of the beam becomes too large, the density of laser is greatly reduced and thus the grinding power is greatly reduced, whereby the size of the beam is preferably set to 50 μm or less.

In addition, the imaging slit 224 may form a femtosecond laser 241 in such a manner as to have a uniform energy distribution, for example, an energy distribution of a square shape, for the purpose of ease of processing. This is because, when performing blade grinding, it is advantageous to have an energy distribution of a square shape in order to cause the processed surface to be exposed to the femtosecond laser for the same time.

Referring to FIGS. 6 and 7, the laser beam passing through the imaging slits 224 is formed in such a manner as to have a uniform energy distribution of, for example, a square, a rectangle, or a circle. Preferably, the laser beam 250 passing through the imaging slit 224 is formed in such a manner as to have a uniform energy distribution of a square shape. Herein, the laser beam has a Gaussian energy distribution in the related art as shown in (a) of FIG. 6 and (a) of FIG. 7, while a square uniform beam is formed through the imaging slit 224 as shown in (b) of FIG. 6 and (b) of FIG. 7.

In the related art, the femtosecond laser has been not used for blade grinding, and in particular, the femtosecond laser has been not used to grind a blade edge for cutting precision electronic components such as MLCC. Because the femtosecond laser has a very small size for the concentration of energy, the femtosecond laser is advantageous for creating a small hole, but is not suitable for grinding a large area such as a blade as in the present invention. However, such problems can be solved through the beam expander 216 and the imaging slit 224 according to an embodiment of the present invention.

Referring to FIG. 4 again, the laser transmission unit 210 may include a second splitter 225. The second splitter 225 transmits a part of the laser light to the CCD camera 234, so that the energy distribution or size of the beam may be checked by the control unit 120. In addition, the control unit 120 may control the energy distribution or size of the beam by controlling the imaging slit 224. Herein, the CCD camera 234 may further include a light (not shown) to perform clear photographing.

Meanwhile, the femtosecond laser 241 passing through the second splitter 225 includes a movable objective lens 222 that focuses the laser on the first inclined surface 142-1 of the blade 140, which is a workpiece. Herein, the movable objective lens 222 is implemented in such a manner as to move in a direction (Z axis direction) parallel to the beam passing through the imaging optical system by a linear motion guide (LM guide) and a motor. The barrel 222-1 moves downward to a portion indicated by the dashed-dotted line when moving in the Z-axis direction, and the movable objective lens 222 also moves together with the barrel 222-1.

The auto focus adjustment module 240 serves to automatically adjust a focal length between the movable objective lens 222 and the blade 140. Preferably, the auto focus adjustment module 240 is configured so that the laser light emitted from the light emitting unit is received by the laser diode, to measure the distance to the blade 140 of a workpiece using an optical triangulation method, transmit the measured distance information to the control unit 120, and adjust the distance between the movable objective lens 222 and the blade 140, thereby controlling the focal length.

Meanwhile, the stage 230 may be moved back and forth/left and right in a state in which the blade 140 of a workpiece is placed. The stage 230 is driven by the blade position control unit 123 of the control unit 120, in which the image of the CCD camera may be used for the purpose of precise control. The alignment control of the blade position using the image of the CCD camera will be described later.

Herein, at least a part of the first inclined surface 142-1 of the blade 140 is ground with a femtosecond laser while controlling the stage 230 to cause the blade placed on the stage 230 to be moved in the longitudinal direction shown in FIG. 10.

In a situation where the interior of the barrel is shielded from outside and the interior is filled with nitrogen gas or foreign matter is prevented from entering the interior using a filter for the purpose of alignment and cleanliness of the laser optical system, it is implemented so that the focal length is controlled by moving the same up and down, and herein it is not necessary to transfer the blade 140 in the Z-axis direction.

Therefore, the stage 230 is configured to move in X and Y axis directions under the control of the blade position control unit 123, which leads to increasing the processing precision as compared to when controlling movement in three axis directions.

In addition, it is preferable that the illumination light source 223 uses a white light source or a He—Ne laser having a wavelength of 633 nm, and allows the light to be emitted to the blade 140 through the reflective mirror.

Hereinafter, the control of the stage 230 according to an embodiment of the present invention will be described with reference to FIGS. 11 and 12.

Referring to FIG. 12, as shown in (a) of FIG. 12, it is preferable that the blade 140 and the laser beam are aligned so that the central portion of the femtosecond laser energy distribution is positioned at the end of the first inclined surface 142-1 of the blade 140.

However, since the blade 140 has a very large size of about 23 cm, 3 cm, but the femtosecond laser energy distribution has a small size of 50 μm or less, for example, about 20 μm, it is very difficult to align the blade 140 and the laser beam.

Therefore, the stage 230 is controlled to allow the blade 140 placed on the stage 230 to be aligned with the laser beam, by using an artificial intelligence model, for example, an autoencoder 300. The autoencoder 300 may be configured in the form of a software module on a PC in which the control unit 120 is configured or a separate server connected to the control unit 120.

Herein, as learning images of the autoencoder 300, an image in which the actual blade 140 is placed on the stage 230 is prepared as an input 310, for example, as shown in (b) or (c) of FIG. 12, and an image on which the blade 140 is preferably placed is prepared as an output 330 as shown in (a) of FIG. 12, thereby allowing learning of the autoencoder 300 in the learning mode.

The autoencoder 300 performs learning in such a manner as to output an image in which the blade and the laser beam are preferably placed no matter what image is received in a detection mode.

Subsequently, in the detection mode, the autoencoder 300 receives an image captured by the CCD camera 234 as an input, and outputs an image in which the blade and the laser beam are preferably placed. Herein, feature vectors are extracted from a hidden layer 320 of the autoencoder 300, and based on the feature vector, it is possible to derive a control amount in the front, rear, left and right directions of the stage 230.

The derived control amount is transmitted to the blade position control unit 123 of the control unit 120, and thus the blade position control unit 123 may align the blade 140 and the laser beam so that the central portion of the femtosecond laser energy distribution is positioned at the end portion of the first inclined surface 142-1 of the blade 140.

Hereinafter, effects of the present invention will be described with reference to FIGS. 13 to 15. FIG. 13 is a cross-sectional view illustrating a blade edge portion.

Referring to FIG. 13 and Table 1 below, an angle A of the blade edge portion 142 additionally ground with a laser is 9° and a width W of the blade 140 has a value of 0.03 or less according to an embodiment of the present invention. In addition, as shown in FIG. 13, the blade 140 according to an embodiment does not have a critical point CP.

Meanwhile, as shown in a table below, an angle A of the blade edge portion 142 is 18° and a width W of the blade 140 is 0.03 or more according to the comparative example (that is, a case in which there is no additional grinding by femtosecond laser). In addition, since the blade 140 according to the comparative example has a critical point CP, damage to the side portion due to the side inflection point may occur.

TABLE 1

| classification | Comparative example | Embodiment |
|---|---|---|
| Angle A of blade | 18° | 9° |
| Width W of blade | 0.03 | 0.03 or less |
| Side edge (CP) | presence | None |

Therefore, when performing additional grinding through a femtosecond laser, since an angle of the blade 140 has been greatly reduced to 9°, it should be appreciated that the cutting load due to the blunting of the blade edge is reduced and thus the life of the blade is greatly increased. Herein, it will be appreciated that when the cutting load is reduced, the coefficient of friction generated between the part and the blade 140 is reduced when the blade 140 cuts the component.

FIG. 14 is a perspective view illustrating a blade according to an embodiment and a comparative example of the present invention. A view (c) of FIG. 14 is an enlarged view showing a part of the blade 140 including the first inclined surface 142-1, in order to illustrate views (a) and (b) FIG. 14. The view (a) of FIG. 14 illustrates the defect of the blade 140 according to the comparative example, and shows a perspective view of a portion A shown in the view (c) of FIG. 14 and a cross-section view of a portion B shown in the view (c) of FIG. 14. The view (b) of FIG. 14 illustrates the defect of the blade 140 according to an embodiment of the present invention, and shows a perspective view shown in the portion A shown in the view (c) of FIG. 14 and a cross-section view portion B shown in the view (c) of FIG. 14.

The view (a) of FIG. 14 shows, as a comparative example, a blade 140 before laser processing, that is, when only grinding by the grinding wheel 112 is performed. It can be seen that the blade edge portion 142 has a bent cross section occurred at one side thereof. When the blade 140 has a bent portion, a defect is determined to have occurred at the blade 140. Herein, it will be appreciated that the defect is disposed above an area where the diagonal pattern is displayed in the cross-sectional view taken along a section B-B in the view (a) of FIG. 14, and the size of the defect is very large.

Referring to the view (b) of FIG. 14, it should be appreciated that the blade 140 has a bent cross section, that is, a defect occurred at one side thereof. Here, it can be seen that the defect is disposed above the area where the diagonal pattern is displayed in the cross-sectional view taken along the section B-B of the view (b) of FIG. 14.

When comparing the views (a) and (b) of FIG. 14, it can be seen that a size of the defect of the blade 140 according to the embodiment is reduced compared to that of the defect of the blade 140 according to the comparative example. In other words, when performing additional grinding using the laser transmission unit 210 after grinding the blade edge portion 142, it is possible to minimize the size of the defect occurring in the blade 140.

Therefore, the apparatus for processing the superfine blade 140 using a laser according to an embodiment of the present invention can minimize the defect by increasing the strength of the blade 140 through laser processing, thereby improving the precision of the blade 140. In addition, the angle of the blade is reduced so that the cutting load is reduced, thereby significantly increasing the life of the blade. In addition, there is an effect of enhancing the strength of the blade edge portion 142, thereby minimizing the defect rate of the blade.

Referring to FIG. 15, burring or chipping may occur in general grinding or ELID grinding technology in the related art. However, according to the femtosecond laser processing of the present invention, the burring or chipping can be removed through the femtosecond laser.

In addition, when cutting components using the blade 140, contamination generated from grinding in the related art can also make the cut components defective while increasing the cutting load. Meanwhile, since the femtosecond laser does not cause additional ground particles, it can be appreciated that contamination is completely removed through additional laser micro-processing.

The invention claimed is:

1. A method of processing a superfine blade edge using a femtosecond laser, the method comprising:
   primarily grinding a blade edge portion by using a grinding wheel, a blade edge being primarily ground in a direction vertical to a rotational direction of the grinding wheel; and
   secondarily grinding at least a part of the blade edge portion by emitting a femtosecond laser to the ground blade edge portion in a lengthwise direction,
   wherein the secondarily grinding comprises: oscillating the femtosecond laser; increasing a size of energy distribution of the femtosecond laser; modifying the energy distribution of the femtosecond laser; aligning a central portion of the energy distribution of the femtosecond laser to an end portion of the blade edge portion; changing an advancing direction of the femtosecond laser and emitting the femtosecond laser to the blade edge portion via a movable objective lens; and emitting the femtosecond laser while moving, in a lengthwise direction of the blade, a stage on which the blade is placed, and
   wherein the blade edge portion has a first inclined surface and a second inclined surface, the second inclined surface is formed through the primarily grinding, the first inclined surface is formed through the secondarily grinding, and the first inclined surface is formed in such a manner as to have a gentler slope than that of the second inclined surface.

2. The method of claim 1, wherein the modifying of the energy distribution of the femtosecond laser comprises: modifying a femtosecond laser beam having a Gaussian distribution into a femtosecond laser beam having a rectangular energy distribution using a condensing lens and an aspherical cylindrical lens.

3. The method of claim 2, wherein the energy distribution of the femtosecond laser is square.

4. The method of claim 3, wherein a size of one side of the square energy distribution of the femtosecond laser is 50 μm or less.

5. The method of claim 1, wherein the aligning of the central portion of the energy distribution of the femtosecond laser to the end portion of the blade edge portion comprises: photographing, by a CCD camera, an alignment of the blade and the femtosecond laser, extracting a feature vector by inputting a photographed image to an autoencoder, deriving a control amount for controlling a position of the blade based on the feature vector, and aligning the blade edge portion and the femtosecond laser by controlling the stage on which the blade is placed on a basis of the deriving.

6. The method of claim 5, wherein the autoencoder photographs the alignment of the blade and the femtosecond laser from the CCD camera and receives a photographing result as an input, and
   the extracting of the feature vector by inputting the photographed image to the autoencoder comprise performing learning so that the autoencoder outputs an image in which the central portion of the energy distribution of the femtosecond laser is normally aligned with the end portion of the blade edge portion.

\* \* \* \* \*